March 6, 1956   C. M. KIMBERLIN   2,737,169
ENGINE HEATER
Filed Aug. 3, 1951   4 Sheets-Sheet 1
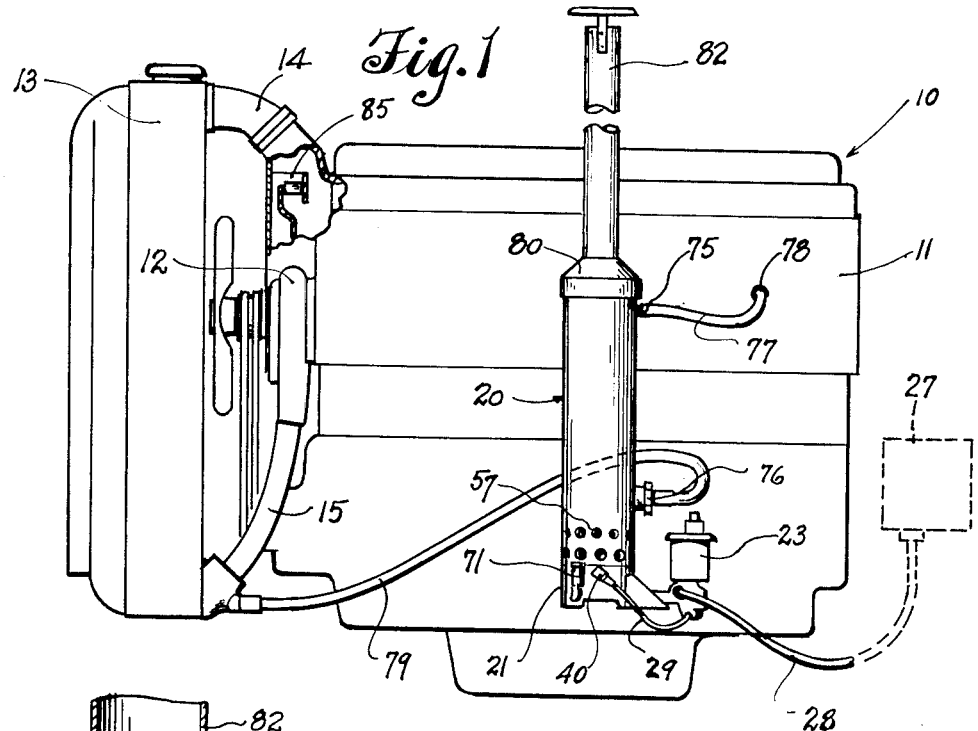
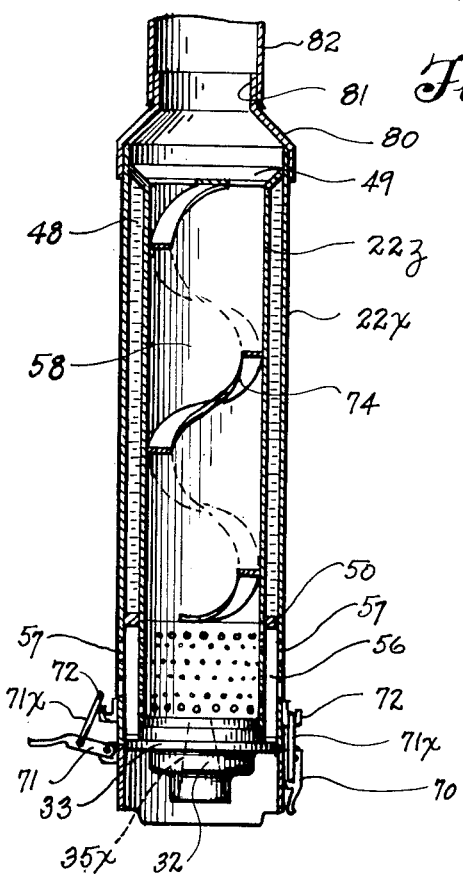
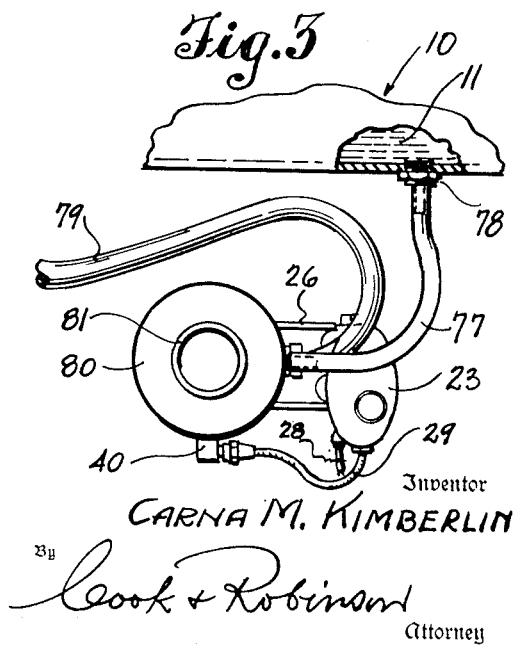
Inventor
CARNA M. KIMBERLIN
By Cook + Robinson
Attorney March 6, 1956

C. M. KIMBERLIN 2,737,169

ENGINE HEATER

Filed Aug. 3, 1951

Inventor
CARNA M. KIMBERLIN
By Cook & Robinson
Attorney

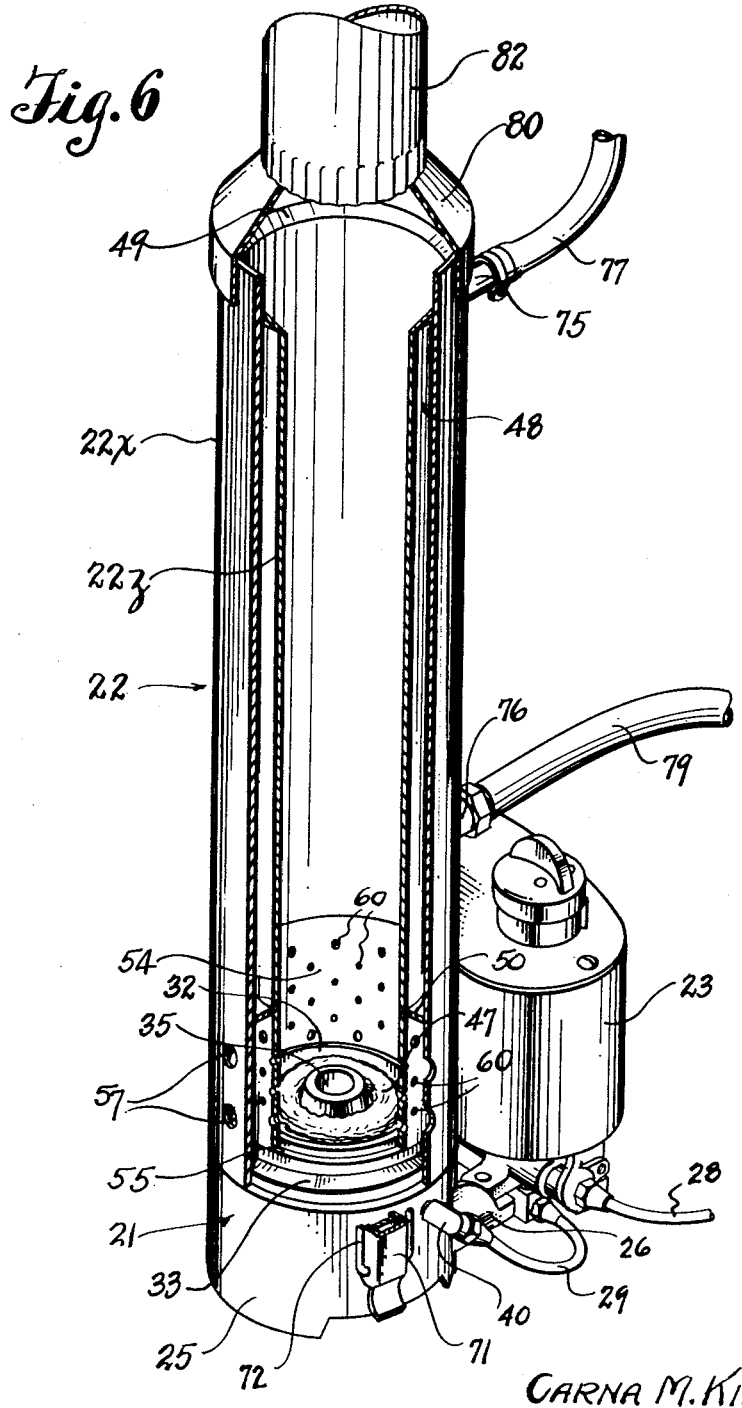

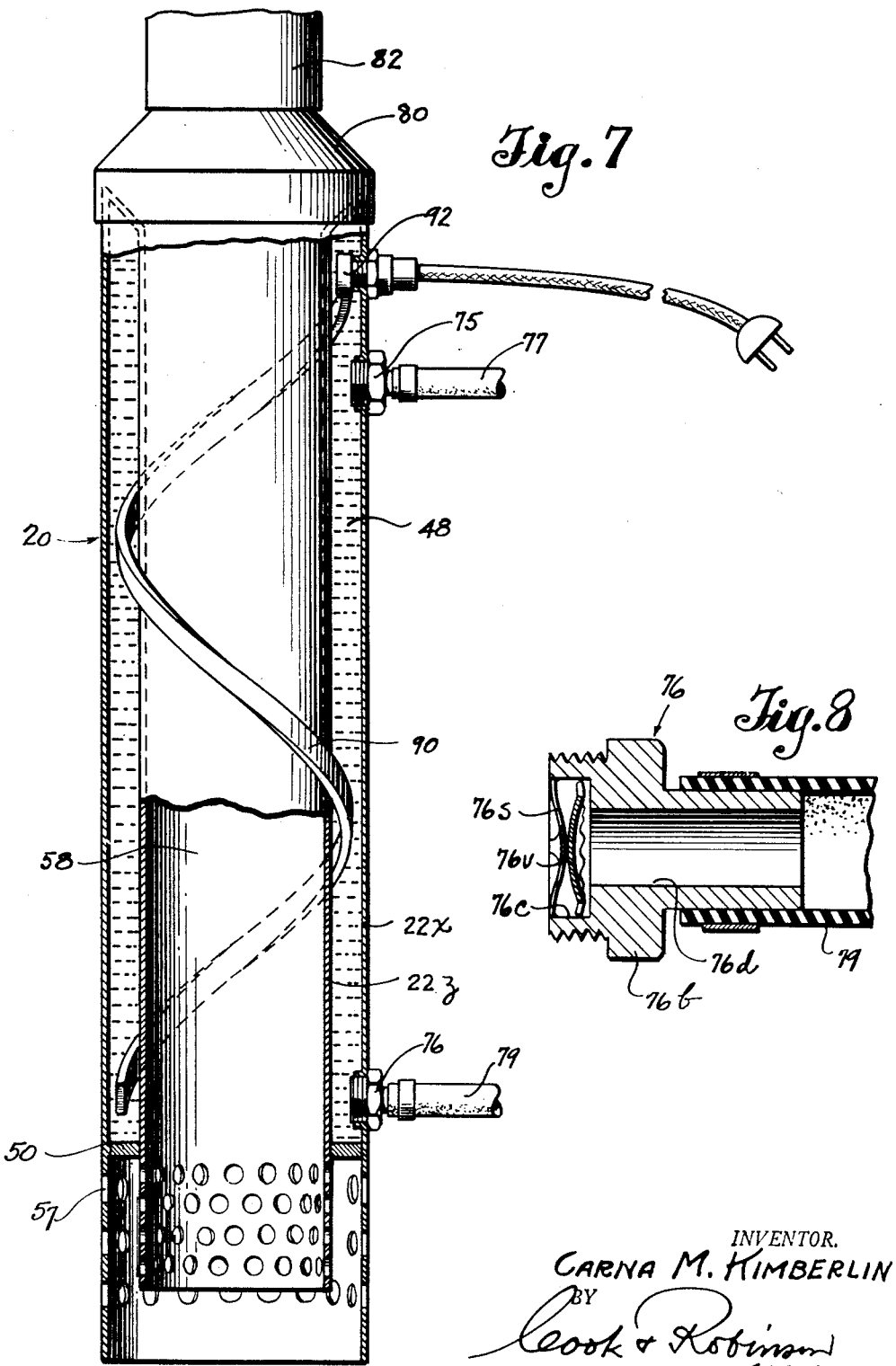

United States Patent Office 2,737,169
Patented Mar. 6, 1956

2,737,169
ENGINE HEATER

Carna M. Kimberlin, Spokane, Wash., assignor to Wayne H. Kimberlin, New York, N. Y.

Application August 3, 1951, Serial No. 240,071

3 Claims. (Cl. 123—142.5)

This invention relates to devices that will herein be designated as "engine heaters" with the understanding, however, that the designation does not indicate a limitation in the use of the device to the heating of engines, but rather indicates one of the uses to which it is now being most advantageously applied.

It is the principal object of this invention to provide an improved form of heater for use in combination with water cooled internal combustion engines of those types using diesel oil, gasolene, kerosene and similar types of fuels, when they are required to be operated in extremely cold weather that makes the starting of the cold engine an especially difficult, time consuming and fuel wasting operation, as well as detrimental to the engine structure.

More particularly, it is the object of the present invention to provide an engine heater of a portable character; that can be readily attached to the engine for use, and likewise can be easily detached when its use is not required. Furthermore, to provide a heater including as a part thereof, a water jacketed boiler that is equipped with fittings whereby water circulating connections between the boiler and the water jacketed portion of the engine that is to be heated may be made, thus to provide that through the heating of the liquid medium of the heater and engine, either by the burning of fuel oil in the burner, or by use of an electric element in the boiler, the engine, its lubricating system and the lubricant, can be quickly warmed to a temperature that will overcome frigid weather starting problems with a resultant saving in time, fuel, labor and destructive wear on engine parts.

It is also an object of this invention to provide an engine heater that is especially designed for use in connection with internal combustion engines comprised within that class that is typified by present day tractor driving engines; a heater that is designed as an engine attachment, and for practical use, especially at times when such engines are subjected to extremely cold weather such as that which generally prevails during the winter months in Northern Alaska, Canada and other countries of the frigid zones.

Yet another object of the invention is to provide a heater that is primarily designed to be heated by the burning of a selected fuel oil therein, but which is equipped with a resistance element through which electric current may be caused to flow as an alternative means for heating the coolant used in the circulatory system.

It is a further object of this invention to provide an improved form of fuel oil burner that is especially applicable for the heating of water cooled, internal combustion engines of the large types used in tractors or automobile trucks, and which is so designed that, in its use, a forced circulation of the cooling medium will be effected in the engine as it is heated.

Still another object of my invention is to provide a unitary heater comprising various parts, including a burner, boiler and fuel flow regulator, that may be readily detached one from the other to facilitate packing, inspection, storage or repair.

Further objects of the invention reside in the specific details of construction of the various parts, and in their combination and mode of use as will hereinafter be fully described.

In accomplishing the above mentioned and other objects of the invention, I have provided the improved details of construction, the preferred forms of which are illustrated in the accompanying drawings, wherein—

Fig. 1 is a side view of the present engine heater, showing it as functionally connected with an engine that is to be heated thereby.

Fig. 2 is a central, vertical section of the boiler as applied to the burner portion of the heater.

Fig. 3 is a top view of the heater, as seen in Fig. 1, and showing the conduit connections between the water jacketed engine block and the water jacketed combustion chamber of the boiler.

Fig. 6 is a perspective view of the device with portions of the walls of the boiler broken away for better understanding of construction.

Fig. 7 is an elevation showing the heater as equipped with electric heating element for alternative use.

Fig. 8 is a detail of the valve structure associated with the boiler inlet.

In order to impart a better understanding of the use of the present engine heater and a practical mode of its application to an engine, I have, in Fig. 1, diagrammatically shown an engine of a type that is typical of those for which the device is designed for use, and have designated the engine generally by numeral 10. The water jacketed cylinder block of the engine, which contains water or other liquid cooling medium is designated at 11, and a pump whereby the cooling liquid of the engine is forcibly circulated to maintain the engine in a properly cooled condition is designated by numeral 12. The pump is adapted to be driven in the usual or in any suitable manner. The water cooling radiator of the engine is designated at 13 and this has a top connection 14 with the water jacketed portion of the engine and a lower end connection 15 with the pump which, in turn, connects with the engine to complete the circulatory system.

It is the primary purpose of the heater to heat the liquid medium in the boiler portion and to effect a forced circulation of this through the cooling system of the engine. Thus the liquid cooling medium, which I will refer to as the "coolant" operates as a vehicle for transferring heat produced by the heater to the engine. The construction is such that the creation of steam in the boiler operates to effect a forced circulation of the coolant in its normal direction.

Figure 4:
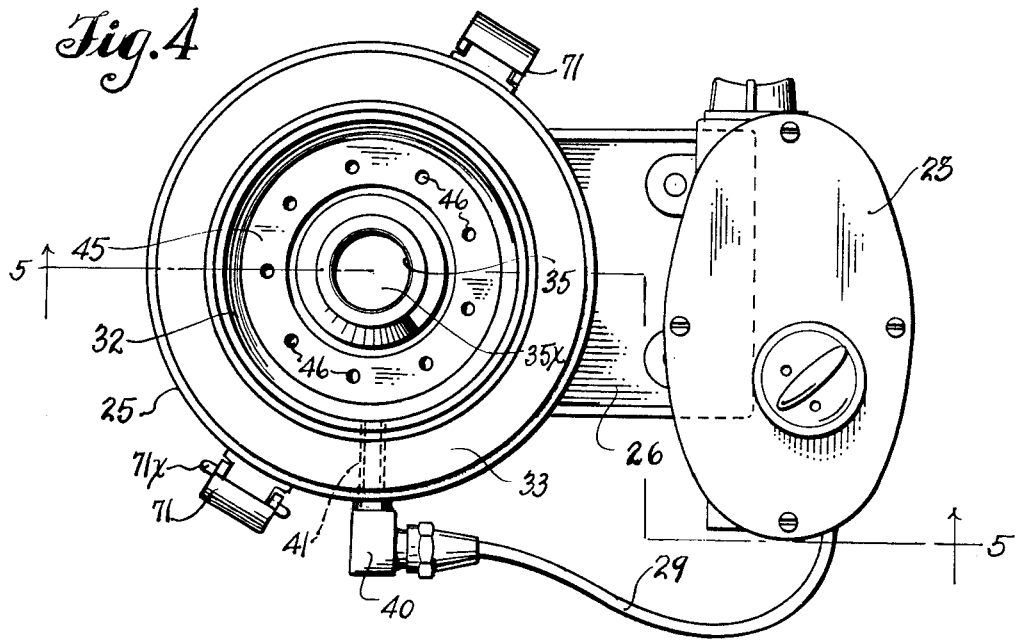
Fig. 4 is an enlarged, top or plan view of the oil burner and fuel flow regulator; the boiler being removed for better showing of the burner.
Figure 5:
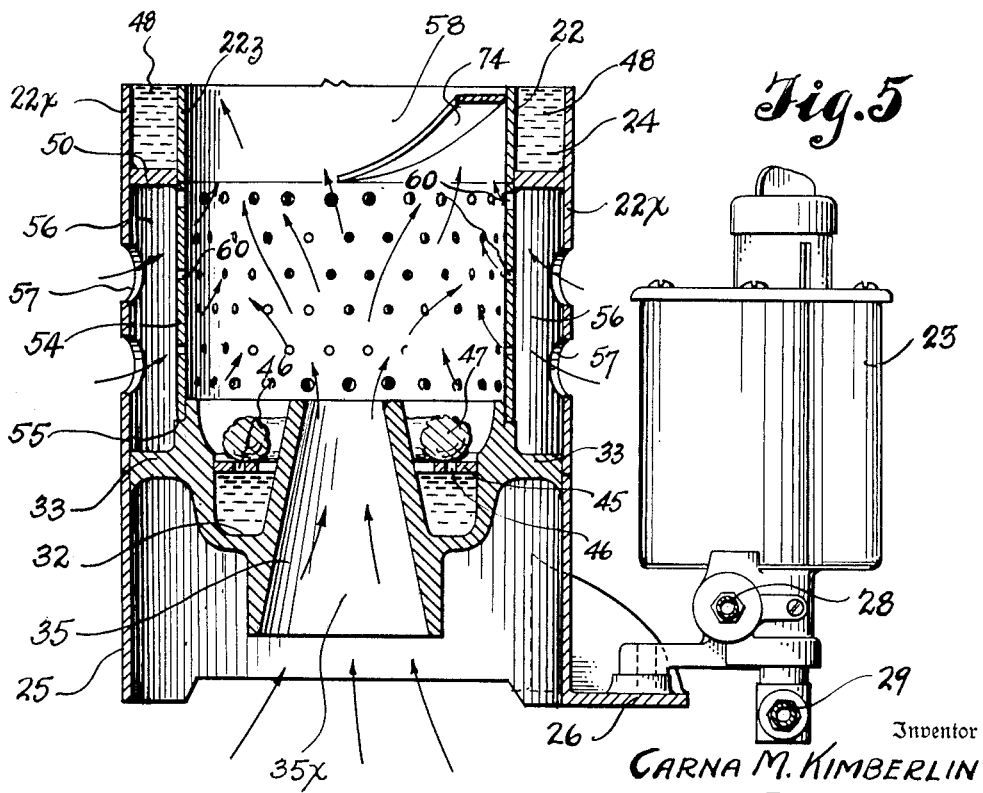
Fig. 5 is a cross-section taken in the vertical plane of the line 5—5 in Fig. 4.

Referring more in detail to the drawings:

In its present preferred form of construction, the heater which is designated in its entirety in Fig. 1 by numeral 20, comprises the oil burner portion 21, the boiler 22 and the fuel flow regulator which is designated in its entirety by numeral 23. The burner portion 21, as best shown in Figs. 4 and 5, comprises a vertically disposed cylindrical housing 25 which constitutes a base member for the boiler presently described. This housing is formed at one side with a horizontally extending shelf, or bracket, 26, upon which the fuel flow regulator 23 is attached as shown.

The fuel flow regulator used in this combination of parts is one of those types of devices that operates to regulate the flow of fuel oil from a source of supply to a receiving vessel and to automatically maintain the oil in the vessel or receptacle at a predetermined level, for example, a device of the character of those illustrated in U. S. Patents Nos. 2,183,815; 2,274,145; 2,293,903 and 2,317,063. Since the flow regulator, per se, forms no part of the present invention, it will not herein be described in detail. It will be explained, however, that fuel oil is supplied to the bowl of the control device 23 from a source of supply, such as indicated at 27 in Fig. 1, through a supply pipe 28. From the control device 23, the fuel oil is admitted, under control, to the burner through a connecting pipe 29, as presently will be more fully explained.

The details of construction of the burner, designated in its entirety by numeral 21, will be best understood by reference to Figs. 4 and 5. In Fig. 5 it is noted that the cylindrical housing 25 is open at the bottom but is closed at its upper end by means of a basin that is set therein. This basin comprises an annular trough 32, formed with an encircling and horizontally projecting flange 33, that fits and is secured within the top end portion of the housing 25. Alternatively, the basin may be integrally formed with the housing 25.

Centrally of the basin, and coaxially of the housing 25 is an air inlet tube 35 of truncated conical form that opens upwardly and through the basin and provides an air passage to the combustion chamber of the boiler. The lower and larger end of the tube 35 terminates within the lower portion of the housing 25. Its upper, smaller end terminates at the level of the top of the trough 32. In a burner having a basin that is approximately 3⅝ inches in diameter, the air passage 35x through the tube 35 has a diameter of ⅞ inch at its upper end and a diameter of 2 inches at its lower end. The length of the tube is about 2½ inches. These dimensions are given only to indicate the proportionate or relative dimensions of parts in a burner now being used and found most satisfactory in this type of heater.

As is clearly shown in Fig. 5, the annular trough 32, formed as a part of the basin is of substantial depth and fuel oil is supplied thereto from the flow control device 23 through pipe 29, a fitting 40 to which the pipe 29 connects and a short length of tubing 41 which mounts the fitting at its outer end and which extends through a side wall of the housing 25 and opens into the bottom portion of the trough.

Fixed in the trough in a horizontal plane substantially below its top edge, is an annular plate 45. This plate is disposed about the air tube 35 at the same level as that at which the fuel oil is to be maintained in the trough by the flow regulator 23. Formed in the plate 45 are perforations 46, as shown best in Fig. 4, and resting upon the plate about the upper end of tube 35 is an annular wick 47 of asbestos material, or the like, which has the property of soaking up oil through the plate perforations and causing it to be dissipated to all parts of the wick for ready burning.

Mounted directly upon and coaxial of the housing 25 is the part which in this application has been referred to as the boiler and designated in its entirety by numeral 22. This comprises a cylindrical outer shell, or housing, 22x which at its lower end, fits closely about the basin trough flange 33 and rests upon the upper end of the housing 25. Within the housing 22x is an inner, tubular shell of wall 22z. The walls 22x and 22z provide an annular water space 48 between them that is closed at its upper and lower ends, respectively, by walls 49 and 50, as seen in Fig. 2, thus to provide the sealed water jacket. The outer cylindrical wall 22x is approximately 15 inches long and 4 inches in diameter, and the water jacket extends from about one inch from its upper end to about three inches from its lower end. Located within the lower end portion of the housing 22x, as a downward continuation of the tubular inner wall 22z, is a cylindrical sleeve 54 which at its lower end fits closely about the top rim of the trough 32 as seen in Fig. 5, and against an annular upwardly facing rim shoulder 55. The passage within the cylindrical wall 22z and its downward continuation 54 constitutes the combustion chamber 58.

Between the sleeve 54 and the lower portion of the boiler wall 22x is an annular air space 56 that is supplied with outside air through a plurality of circular holes or openings 57 formed in the wall 22x. Preferably, these holes are about ½ inch in diameter and are arranged in two circular rows. The holes in each row are about 2 inches apart, center to center, and the rows are about one inch apart, center to center.

The sleeve 54 is formed with a plurality of encircling and vertically spaced rows of small holes or perforations 60. In a preferred construction, the rows are about ½ inch apart, and the holes in the rows are about ½ inch apart. Holes of the upper and lower rows are ⅛ inch in diameter, and those of the intermediate rows are 1/16 inch in diameter. This arrangement of holes 57 and 60 for supplying air to the combustion chamber 58 has been found to be the most advantageous in the heater as here in shown.

The boiler 22, as disposed directly upon the burner housing 25, is adapted to be fixedly secured thereto by two oppositely disposed and easily releasable latches, as shown in Fig. 2. Each latch comprises a toggle 71 that is hingedly attached to a lug on the housing 25. Each toggle comprises an upper end link 71x adapted to be applied over a hook 72 that is welded on the lower end portion of housing 22x. When the toggle links are engaged with the hooks 72 and the toggles swung to holding position as in Fig. 2, the boiler will be held thereby, rigidly secure upon the housing 25. When the toggle links are released from the hooks, the burner can be removed from the boiler or vice versa.

Disposed within the combustion chamber 58, closely adjacent the side walls thereof, is a baffle 74 in the form of a helical strip. This strip is about ½ inch in width and makes two complete turns in the length of the combustion chamber. It may be supported in position by any suitable means, for example, it can be secured to the chamber wall, or alternatively, supported by a spider attached to its upper end and adapted to rest upon the upper end wall 49 of the water jacket.

Extended laterally from the housing 22 and from the upper and lower ends of the water jacketed portion of the boiler, are tubular fittings 75 and 76. A flexible conduit 77 extends from the fitting 75 to a tap 78 in a side wall of the water jacketed portion 11 of the engine 10 near the rear of the engine block. Likewise, a similar conduit 79 extends from the fitting 76 to the lower circulatory connection 15 at the forward end of the engine. Thus, a conduit system for the most practical mode of circulating the coolant in the cooling system of the engine and the boiler is set up.

As an important detail of construction, and in accordance with the stated object of effecting a forced circulation of the coolant through the circulatory system of the engine, the fitting 76 through which the inlet connection between radiator 13 and boiler is made, is equipped with a check valve like or of the character of that shown in Fig. 8 wherein 76 designates the fitting in its entirety and it is shown to be formed with a wrench head body 76b adapted to be threaded into the opening in wall 22x. Formed in the body is a bore 76c from which a bore 76d of lesser diameter extends. Together the bores 76c and 76d form a passage through the fitting. The conduit 79 connects with this channel at the outer end of the fitting. The bore 76c opens into the boiler.

Contained in the bore 76c is a disk valve 76v and this is adapted to close against the base surface of the bore to close the passage against free flow of liquid in a direction from the boiler to the radiator 13, except in very limited volume as provided for by an irregularly formed, or deformed valve disk or otherwise. A spider 76s is fixed in the outer end of bore 76c to hold the valve in position. With the connections as thus provided, it is possible for a ready inflow of liquid from radiator 13 through pipe 79 and fitting 76 to the boiler, but a very limited flow in the other direction. The significance of the use of this valve will presently be explained.

It is preferred also to equip the upper end of the housing 22x with a bonnet 80 having a conical top wall leading to a tubular outlet 81 to which the lower end of a tubular stack or chimney 82 is applied. The stack can be extended to a desired or required height.

It is further anticipated that the present heater shall, if desired be equipped with an electrical resistance element so that when electric current is available, an electrical circuit connection can be made with the element and the boiler heated electrically in lieu of using the oil burner. In accordance with this object I have shown, in Fig. 7, an electric element 90 located within the water jacketed portion of the boiler. This may assume various forms, but is most practical in the helical form shown. It is extended from top to bottom of the boiler and makes approximately one and one-half turns in that length. At one end, the element is equipped with terminals, as at 92, exterior of the boiler, to which circuit connections can be made in the usual way, with an extension cord, thus enabling the element to be connected with the usual 110 or 220 volt lighting system. When such source of electricity is used, the burner and regulator could be detached from the boiler. When electric current is not available, the oil burner is used as the source of heat.

In this connection it will be explained that in most engines a thermostatic valve as at 85 in Fig. 1, is provided in the water connection leading from the engine block to the top of the radiator which ordinarily would be closed when the coolant is cold, and would open only upon the coolant reaching that predetermined temperature for which the thermostat is set to open. Also, there is a by-pass from the top of the engine block to the pump so that the coolant can be circulated by the pump through the engine before the thermostatic valve opens. This thermostatic valve and by-pass arrangement has an influence on the mode of operation of the system as presently will be explained.

With the parts of the device so constructed and assembled, the heater, in buring oil, is used as follows: First, by proper adjustment of the device 23, fuel oil is permitted to flow into the basin or trough 32 of the burner and is brought up to and maintained at the predetermined level. At this level it saturates the wick 47. The oil on the wick can then be ignited and burned, and as it burns it heats up the surrounding walls of the combustion chamber and this causes ready gasification of the oil. Air to support initial combustion is supplied through the openings 57 and the multiplicity of wall perforations 60. Also additional air enters through the ventura passage 35x and as this air stream is admitted to the combustion chamber from the upper end of the constricted ventura passage, it expands and sweeps the burning gases outwardly toward and against the side wall surfaces of the chamber. The helically directed baffle strip 74 that is applied to the chamber wall causes a spiral whirling, upward movement of the burning gases that retards their upward speed and causes them to be pressed against the chamber walls with greater heating advantage.

In reference to use of the helical baffle 74, it is believed significant to recite here that the use of a baffle of the character shown has, by actual test, produced an increase of from 3700 B. t. u. to 4800 B. t. u. in a heater now in use.

With the device so constructed, applied and used, the water, or whatever other liquid medium may be used as a coolant in the circulatory system of the engine, will be quickly heated and caused to be forcibly circulated through the engine.

It will further be explained that, in view of the details of engine construction, providing for use of the pump 12 and thermostatic control device 85, there is no initial circulation of the coolant through the radiator 13. As the coolant in the boiler becomes heated and steam pressure builds up to a certain amount, the valve disk in fitting 76 will be pressed to closed position, and since pressure in the boiler will then build up faster than it can be relieved through the exit 75 the coolant finally belches into the engine block and is forced through the by-pass of the engine pump. The cold coolant is then both forced into the inlet of the heater by the pressure thus created and sucked in by the existing hot coolant, the valve having been opened in the process. Immediately thereafter the pressure again begins to build up in the boiler, the valve is closed by said pressure, another belch occurs and the process is repeated, hence the pumping action which forces the coolant in one direction from the boiler to the engine block down through the engine pump by-pass and back into the boiler at 76.

Up to this point the engine thermostat has played no part in the operation described. The engine thermostat only operates after the coolant in the engine block reaches a temperature at which the thermostat is designed to open. For example if the engine is equipped with a thermostat designed to open at 160 degrees F. then circulation will only be affected through the radiator when the engine has operated to raise the temperature of the coolant in the engine block to 160 degrees. Then the circulation will be both past the thermostat into the radiator to the heater and also through the engine pump by-pass 15.

The heating of the engine naturally heats the lubricating system and lubricant which is one of the greatest advantages in use of the device. The fact that the lubricant is warmed, as well as the engine, is of great benefit not only to starting but also it permits the lubricant to flow and thus excessive and damaging wear is avoided.

Engine heaters of the kinds above described have proven to be exceptionally applicable to large engines burning diesel oil, and operating in frigid weather. The cold weather starting troubles have been eliminated by their use and labor, fuel and expense materially reduced, and damage due to starting without free flowing lubricant eliminated.

Such devices may be made in various sizes and varied in design to meet requirements. However, for their ordinary intended uses, the best results are to be obtained by closely following the illustrated or stated proportionate dimensions. The heater, as provided with electrical element provides a practical, safe and convenient heating means when electric current is available.

Having thus described my invention, and what I claim as new therein and desire to secure by Letters Patent, is:

1. The combination with an internal combustion engine having a cooling system including a water cooling radiator, conduit connections between upper and lower portions of engine and radiator, a water circulating pump connected in the systems for a forced circulation of the cooling medium, a thermostatically controlled valve in the upper radiator connection and a by-pass through which water can be circulated in the engine by the pump when the thermostatic valve is closed; of a water heater comprising a water boiler, means for supplying heat to the boiler, conduits connecting upper and lower parts of the boiler with upper and lower parts of the engine cooling system, and a check-valve in the lower connection that closes against inflow through that connection under the force of steam generated in the boiler means in said check valve to permit limited outflow through said lower connection.

2. In combination with a water cooled engine of the character described; an engine heater comprising a vertically disposed boiler of tubular form having spaced enclosing walls providing a central combustion chamber, open at upper and lower ends of the boiler and a water jacket surrounding the said combustion chamber, conduits connecting the water jacketed portion of the boiler with the water cooling system of the engine for intercirculation of water, a heating element in the water jacket and extending therein spirally along the combustion chamber.

3. A combination as in claim 1 wherein the check valve containing connection comprises a fitting formed with a water passage including a diametrically enlarged portion in which the valve is contained, and providing an annular shoulder against which said valve is adapted to close; said valve being of disk form and designed to seat imperfectly to provide for a limited flow of water past the valve when in its closed position.

References Cited in the file of this patent

UNITED STATES PATENTS

| Number | Name | Date |
|---|---|---|
| 742,629 | Gorrell | Oct. 27, 1903 |
| 1,258,068 | Wetzler | Mar. 5, 1918 |
| 1,300,600 | Giesler | Apr. 15, 1919 |
| 1,613,615 | Lippert | Jan. 11, 1927 |
| 1,716,715 | Whelan | June 11, 1929 |
| 1,725,510 | Fiske | Aug. 20, 1929 |
| 1,775,458 | Henry et al. | Sept. 9, 1930 |
| 1,828,978 | Moe | Oct. 27, 1931 |
| 2,125,966 | Sweatt | Aug. 9, 1938 |
| 2,180,663 | Bergeron et al. | Nov. 21, 1939 |
| 2,420,981 | Rivers | May 20, 1947 |